(12) United States Patent
Vorbach et al.

(10) Patent No.: US 6,526,520 B1
(45) Date of Patent: Feb. 25, 2003

(54) METHOD OF SELF-SYNCHRONIZATION OF CONFIGURABLE ELEMENTS OF A PROGRAMMABLE UNIT

(75) Inventors: Martin Vorbach, Karlsruhe (DE); Robert Münch, Karlsruhe (DE)

(73) Assignee: Pact GmbH, Karlsruhe (DE)

( * ) Notice: Subject to any disclaimer, the term of this patent is extended or adjusted under 35 U.S.C. 154(b) by 0 days.

(21) Appl. No.: 09/537,932

(22) Filed: Mar. 29, 2000

Related U.S. Application Data

(62) Division of application No. 08/946,812, filed on Oct. 8, 1997, now Pat. No. 6,081,903.

(30) Foreign Application Priority Data

Feb. 8, 1997 (DE) .......................................... 197 04 728

(51) Int. Cl.[7] .............................. G06F 1/04; G06F 9/00
(52) U.S. Cl. ...................................... 713/600; 712/200
(58) Field of Search ................. 712/19, 200; 713/400, 713/500, 600

(56) References Cited

U.S. PATENT DOCUMENTS

| | | |
|---|---|---|
| 4,591,979 A | 5/1986 | Iwashita |
| 4,706,216 A | 11/1987 | Carter |
| 4,739,474 A | 4/1988 | Holsztynski et al. |
| 4,761,755 A | 8/1988 | Ardini et al. |
| 4,811,214 A | 3/1989 | Nosenchuck et al. |
| 4,852,048 A | 7/1989 | Moton |
| 4,870,302 A | 9/1989 | Freeman |
| 4,901,268 A | 2/1990 | Judd |
| 4,967,340 A | 10/1990 | Dawes |
| 5,014,193 A | 5/1991 | Garner et al. |
| 5,015,884 A | 5/1991 | Agrawal et al. |
| 5,021,947 A | 6/1991 | Campbell et al. |
| 5,023,775 A | 6/1991 | Poret |

(List continued on next page.)

FOREIGN PATENT DOCUMENTS

| | | |
|---|---|---|
| DE | 4416881.0 | 11/1994 |
| DE | 19654595 | 7/1998 |
| DE | 19654846 | 7/1998 |
| DE | 19704728 | 8/1998 |
| DE | 19651075 | 10/1998 |
| EP | 0 221 360 | 5/1987 |
| EP | 0428327 A1 | 5/1991 |
| EP | 0748051 A2 | 12/1991 |
| EP | 748 051 A2 | 12/1991 |
| EP | 0539595 A1 | 5/1993 |
| EP | 0 678 985 | 10/1995 |
| EP | 0 726 532 | 8/1996 |
| EP | 0735685 | 10/1996 |
| EP | 735 685 | 10/1996 |
| EP | 726532 | 8/2000 |
| WO | A9004835 | 5/1990 |
| WO | WO90/11648 | 10/1990 |
| WO | A9311503 | 6/1993 |
| WO | 94/08399 | 4/1994 |
| WO | 95/00161 | 1/1995 |
| WO | 95/26001 | 9/1995 |
| WO | 0707269 A | 4/1996 |

OTHER PUBLICATIONS

Norman, Richard S., Hyperchip Business Summary, The Opportunity, Jan. 31, 2000, pp. 1–3.

(List continued on next page.)

*Primary Examiner*—Dennis M. Butler
(74) *Attorney, Agent, or Firm*—Kenyon & Kenyon

(57) ABSTRACT

A method of synchronizing and reconfiguring configurable elements in a programmable unit is provided. A unit has a two- or multi-dimensional, programmable cell architecture (e.g., DFP, DPGA, etc.), and any configurable element can have access to a configuration register and a status register of the other configurable elements via an interconnection architecture and can thus have an active influence on their function and operation. By making synchronization the responsibility of each element, more synchronization tasks can be performed at the same time because independent elements no longer interfere with each other in accessing a central synchronization instance.

14 Claims, 2 Drawing Sheets

U.S. PATENT DOCUMENTS

| | | |
|---|---|---|
| 5,043,978 A | 8/1991 | Nagler et al. |
| 5,081,375 A | 1/1992 | Pickett et al. |
| 5,109,503 A | 4/1992 | Cruickshank et al. |
| 5,113,498 A | 5/1992 | Evan et al. |
| 5,115,510 A | 5/1992 | Okamoto et al. |
| 5,123,109 A | 6/1992 | Hillis |
| 5,125,801 A | 6/1992 | Nabity et al. |
| 5,128,559 A | 7/1992 | Steele |
| 5,142,469 A | 8/1992 | Weisenborn |
| 5,204,935 A | 4/1993 | Mihara et al. |
| 5,208,491 A | 5/1993 | Ebeling et al. |
| 5,226,122 A | 7/1993 | Thayer et al. |
| RE34,363 E | 8/1993 | Freeman |
| 5,233,539 A | 8/1993 | Agrawal et al. |
| 5,247,689 A | 9/1993 | Ewert |
| 5,287,472 A | 2/1994 | Horst |
| 5,301,284 A | 4/1994 | Estes et al. |
| 5,301,344 A | 4/1994 | Kolchinsky |
| 5,303,172 A | 4/1994 | Magar et al. |
| 5,336,950 A | 8/1994 | Popli et al. |
| 5,347,639 A | 9/1994 | Rechtschaffen et al. |
| 5,361,373 A | 11/1994 | Gilson |
| 5,410,723 A | 4/1995 | Schmidt et al. |
| 5,418,952 A | 5/1995 | Morley et al. |
| 5,421,019 A | 5/1995 | Holsztynski et al. |
| 5,422,823 A | 6/1995 | Agrawal et al. |
| 5,426,378 A | 6/1995 | Ong |
| 5,430,687 A | 7/1995 | Hung et al. |
| 5,440,245 A | 8/1995 | Galbraith et al. |
| 5,440,538 A | 8/1995 | Olsen et al. |
| 5,442,790 A | 8/1995 | Nosenchuck |
| 5,444,394 A | 8/1995 | Watson et al. |
| 5,448,186 A | 9/1995 | Kawata |
| 5,455,525 A | 10/1995 | Ho et al. |
| 5,457,644 A | 10/1995 | McCollum |
| 5,465,375 A | 11/1995 | Thepaut et al. |
| 5,473,266 A | 12/1995 | Ahanin et al. |
| 5,473,267 A | 12/1995 | Stansfield |
| 5,475,583 A | 12/1995 | Bock et al. |
| 5,475,803 A | 12/1995 | Stearns et al. |
| 5,475,856 A | 12/1995 | Kogge |
| 5,483,620 A | 1/1996 | Pechanek et al. |
| 5,485,103 A | 1/1996 | Pedersen et al. |
| 5,485,104 A | 1/1996 | Agrawal et al. |
| 5,489,857 A | 2/1996 | Agrawal et al. |
| 5,491,353 A | 2/1996 | Kean |
| 5,493,239 A | 2/1996 | Zlotnick |
| 5,497,498 A | 3/1996 | Taylor |
| 5,506,998 A | 4/1996 | Kato et al. |
| 5,510,730 A | 4/1996 | El Gamal et al. |
| 5,511,173 A | 4/1996 | Yamaura et al. |
| 5,513,366 A | 4/1996 | Agarwal et al. |
| 5,521,837 A | 5/1996 | Frankie et al. |
| 5,522,083 A | 5/1996 | Gove et al. |
| 5,532,693 A | 7/1996 | Winters et al. |
| 5,532,957 A | 7/1996 | Malhi |
| 5,535,406 A | 7/1996 | Kolchinsky |
| 5,537,057 A | 7/1996 | Leong et al. |
| 5,537,601 A | 7/1996 | Kimura et al. |
| 5,541,530 A | 7/1996 | Cliff et al. |
| 5,544,336 A | 8/1996 | Kato et al. |
| 5,548,773 A | 8/1996 | Kemney et al. |
| 5,555,434 A | 9/1996 | Carlstedt |
| 5,559,450 A | 9/1996 | Ngai et al. |
| 5,561,738 A | 10/1996 | Kinerk et al. |
| 5,570,040 A | 10/1996 | Lytle et al. |
| 5,583,450 A | 12/1996 | Trimberger et al. |
| 5,586,044 A | 12/1996 | Agrawal et al. |
| 5,587,921 A | 12/1996 | Agrawal et al. |
| 5,588,152 A | 12/1996 | Dapp et al. |
| 5,590,345 A | 12/1996 | Barker et al. |
| 5,590,348 A | 12/1996 | Barker et al. |
| 5,596,742 A | 1/1997 | Agarwal et al. |
| 5,617,547 A | 4/1997 | Feeney et al. |
| 5,634,131 A | 5/1997 | Matter et al. |
| 5,649,176 A * | 7/1997 | Selvidge et al. ............ 713/400 |
| 5,652,894 A | 7/1997 | Hu et al. |
| 5,655,124 A | 8/1997 | Lin |
| 5,659,797 A | 8/1997 | Zandveld et al. |
| 5,713,037 A | 1/1998 | Wilkinson et al. |
| 5,717,943 A | 2/1998 | Barker et al. |
| 5,734,921 A | 3/1998 | Dapp et al. |
| 5,742,180 A | 4/1998 | Detton |
| 5,748,872 A | 5/1998 | Norman |
| 5,754,871 A | 5/1998 | Wilkinson et al. |
| 5,761,484 A | 6/1998 | Agarwal et al. |
| 5,778,439 A | 7/1998 | Trimberger et al. |
| 5,794,059 A | 8/1998 | Barker et al. |
| 5,801,715 A | 9/1998 | Norman |
| 5,828,858 A * | 10/1998 | Athanas et al. ............. 710/131 |
| 5,838,165 A | 11/1998 | Chatter |
| 5,844,888 A | 12/1998 | Markkula |
| 5,854,918 A * | 12/1998 | Baxter ........................ 713/500 |
| 5,867,691 A | 2/1999 | Shiraishi |
| 5,892,961 A | 4/1999 | Trimberger et al. |
| 5,915,123 A | 6/1999 | Mirsky et al. |
| 5,927,423 A | 7/1999 | Wada et al. |
| 5,936,424 A | 8/1999 | Young et al. |
| 5,965,518 A | 10/1999 | DeHon et al. |
| 6,014,509 A | 4/2000 | Furtek et al. |
| 6,052,773 A | 4/2000 | DeHon et al. |
| 6,034,538 A | 5/2000 | Abramovici |
| 6,081,903 A * | 6/2000 | Vorbach et al. ............. 713/400 |
| 6,054,873 A | 8/2000 | Laramic |
| 6,108,760 A | 8/2000 | Mirsky et al. |
| 6,122,719 A | 9/2000 | Mirsky et al. |
| 6,127,908 A | 10/2000 | Bozler et al. |
| 6,202,182 B1 | 5/2001 | Abramovici et al. |
| 6,243,808 B1 | 6/2001 | Wang |
| 6,282,627 B1 | 8/2001 | Wong et al. |
| 6,288,566 B1 | 9/2001 | Hanrahan et al. |
| 6,311,200 B1 | 10/2001 | Hanrahan et al. |
| 6,341,318 B1 | 1/2002 | Dakhil |
| 6,347,346 B1 | 2/2002 | Taylor |
| 6,349,346 B1 | 2/2002 | Hanrahan et al. |
| 6,370,596 B1 | 4/2002 | Dakhil |
| 6,389,579 B1 | 5/2002 | Phillips et al. |
| 6,392,912 B1 | 5/2002 | Hanrahan et al. |

OTHER PUBLICATIONS

Villasenor, John, et al., "Configurable Computing." *Scientific American,* vol. 276, No. 6, Jun. 1997, pp. 66–71.

Villasenor, John, et al., "Configurable Computing Solutions for Automatic Target Recognition," *IEEE,* 1996 pp. 70–79.

Tau, Edward, et al., "A First Generation DPGA Implementation," *FPD'95,* pp. 138–143.

Athanas, Peter, et al., "IEEE Symposium on FPGAs For Custom Computing Machines," *IEEE Computer Society Press,* Apr. 19–21, 1995, pp. i–vii, 1–222.

Bittner, Ray, A., Jr., "Wormhole Run–Time Reconfiguration: Conceptualization and VLSI Design of a High Performance Computing system," *Dissertation,* Jan. 23, 1997, pp. i–xx, 1–415.

Myers, G., Advances in Computer Architecture, Wiley–Interscience Publication, 2nd ed., John Wiley & Sons, Inc. pp. 463–494, 1978.

M. Saleeba, "A Self–Contained Dynamically Reconfigurable Processor Architecture", Sixteenth Australian Computer Science Conference, ASCS–16, QLD, Australia, Feb., 1993.

M. Morris Mano, "Digital Design," by Prentice Hall, Inc., Englewood Cliffs, New Jersey 07632, 1984, pp. 119–125, 154–161.

Maxfield, C. "Logic that Mutates While–U–Wait" EDN (Bur. Ed) (USA), EDN (European Edition), Nov. 7, 1996, Cahners Publishing, USA.

* cited by examiner

METHOD OF SELF-SYNCHRONIZATION OF CONFIGURABLE ELEMENTS OF A PROGRAMMABLE UNIT

CROSS-REFERENCE TO RELATED APPLICATION

This application is a division of U.S. Ser. No. 08/946,812, filed Oct. 8, 1997 now U.S. Pat. No. 6,081,903.

FIELD OF THE INVENTION

The present invention relates to a method of synchronization and reconfiguration of configurable elements in a programmable unit.

BACKGROUND INFORMATION

Synchronization of configurable elements in conventional units (e.g., FPGAs, DPGAs, etc.) is usually based on the clock pulse of the unit. This type of time-controlled synchronization poses many problems. One problem is that the amount of time a task will require is often not known until a final result is achieved. Another problem with time-controlled synchronization is that the event upon which the synchronization occurs is triggered by an independent element instead of the element to be synchronized itself. In this case, two different elements are involved in the synchronization which leads to high management overhead.

SUMMARY OF THE INVENTION

The present invention relates to a method for synchronization based on the elements to be synchronized themselves. In accordance to an exemplary embodiment according to the present invention, synchronization is no longer implemented or administered by a central instance. By making synchronization the responsibility of each element, more synchronization tasks can be performed at the same time because independent elements no longer interfere with each other in accessing the central synchronization instance.

In a unit with a two- or multi-dimensional, programmable cell architecture (e.g., DFP, DPGA, etc.), any configurable element can have access to the configuration and status register of the other configurable elements via an interconnection architecture and can thus have an active influence on their function and operation. Thus, in addition to the usual method, the configuration may also take place from a processing array (see PACT02: PA) through a primary logic unit.

DETAILED DESCRIPTION

Figure 1:
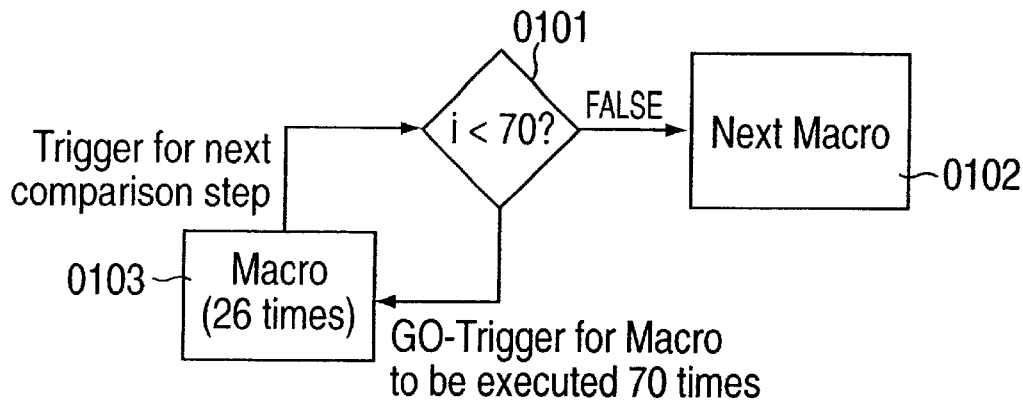
FIG. 1 shows an exemplary loop construct implemented using triggers in accordance with the present invention.

The present invention includes a run-time programmable, run-time reconfigurable unit. The configurable elements on the chip have one or more configuration registers for different tasks. Read and write access to these configuration registers may be provided. In describing the present invention, it is assumed that a configuration can be set in an element to be configured for the following information:

Interconnection register. The type of connection with other cells is set in this register.

Command register. The function to be carried out by the configurable element is entered in this register.

Status register. The cell stores its current status in this register. This status provides information to the other elements of the component regarding which processing cycle the cell is in.

A cell is configured by a command which determines the function of the cell that is to be carried out. In addition, configuration data are entered to set the interconnection with other cells and the contents of the status register. The cell is then ready for operation after this procedure.

To permit a flexible and dynamic interaction of multiple cells, each cell can have read or write access to all the configuration registers of another cell. The type of command with which a specific cell has been configured will determine to which of the many configuration registers the cell has read or write access. Each command that can be executed by the cell exists in as many different modes of address as there are different independent configuration registers in an element to be configured.

For example, assume that a cell has the configuration registers indicated above (i.e., interconnection, command and status) and is set to execute an ADD command, which performs addition. Through the various types of ADD commands, the present invention allows a selection of where the result of this function is to be transferred. The following are examples of some possibilities:

ADD-A. The result is transmitted to operand register A of the target cell.

ADD-B. The result is transmitted to operand register B of the target cell.

ADD-V. The result is transmitted to the interconnect register of the target cell.

ADD-S. The result is transmitted to the status register of the target cell.

ADD-C. The result is transmitted to the command register of the target cell.

In addition to generating the result, each cell can also generate a number of trigger signals. The trigger signals need not necessarily be transmitted to the same target cell that receives the result of processing the configured command. One trigger signal or a combination of multiple trigger signals triggers a certain action in the target cell or puts the cell in a certain status. A description of the states can be found in the following text. The following are some exemplary trigger signals:

GO trigger. The GO trigger puts the target cell in a READY status.

RECONFIG trigger. The RECONFIG trigger sets the target cell in a RECONFIG status, so that the cell can be reprogrammed. This trigger is especially appropriate in conjunction with switching tables. If it is assumed that the data to be processed is loaded into the operand registers at the rising edge of the clock pulse, processed in the period of the H level, and written to the output register at the trailing edge, then reconfiguration of the cell is possible at the trailing edge. The new configuration data is written to the command register at the trailing edge. The period of the L level is sufficient to successfully conclude the reconfiguration.

STEP trigger. The STEP trigger triggers a single execution of the configured command by the target cell that is in a WAIT status.

STOP trigger. The STOP trigger stops the target cell by setting the cell in a STOP status.

The ability to indicate, in the processing cell, which register of the target cell the result is to be entered and which type of trigger signal is to be generated, a quantity of management data can be generated from a data stream. This management data is not a result of the actual task to be processed by the chip, but instead serves only the function of management (e.g., synchronization, optimization, etc.) of the internal status.

Each cell can assume the following states, which are represented by appropriate coding in the status register:

READY. The cell has been configured with a valid command and can process data. Processing takes place with each clock cycle. The data is entered into the register of the target cell on the basis of the addressing type of the cell sending the data.

WAIT. The cell has been configured with a valid command and can process data. Processing takes place in part on the basis of a trigger signal which can be generated by other elements of the unit. The data is entered into the register of the target cell on the basis of the addressing type of the cell sending the data.

CONFIG. The cell has not been configured with a valid command. The data packet which is sent to the cell with the next clock cycle is entered into the command register. The data packet is entered into the command register, regardless of which addressing type has been used by the cell sending the data.

CONFIG WAIT. The cell has not been configured with a valid command. A data packet is entered with the next trigger signal which can be generated by other elements of the unit and can be written to the command register. The data packet is entered into the command register, regardless of which addressing type has been used by the cell sending the data.

RECONFIG. The cell has been configured with a valid command, but it is not processing any data at the moment. The data is accepted by the cell (transferred to the input register) but is not processed further.

STOP. The cell is configured with a valid command, processed, but with no data so far. The data is received by the cell (transmitted to the input register) but not further processed.

Due to these various states and the possibility of read and write access to the various registers of the other cells, each cell can assume an active management role. In contrast, conventional units of this type have a central management instance which must always know and handle the overall status of the unit.

To achieve greater flexibility, there is another class of commands which change in type after the first execution. Using the example of the ADD command, the command may have the following format:

ADD-C-A. The result of the ADD function is written to the command register of the target cell with the first execution of the command. With each subsequent execution, the result is written to operand register A.

This possibility can be expanded as much as desired, so that commands of the type ADD-C-V-A-C- . . . B are also conceivable. Each command can assume all permutated combinations of the different addressing and triggering types.

The following are hardware expansions that may be required to implement an exemplary embodiment according to the present invention using a base device described in PACT02. In addition, a complete illustration of the necessary hardware is also provided in FIG. 4.

Additional Registers

A status register and a configuration register are added to the registers described in PACT02. Both registers are triggered by the PLU bus and have a connection to the state machine of the SM UNIT (PACT02, FIG. 2: 0213).

Change in the PLU Bus

Figure 2:
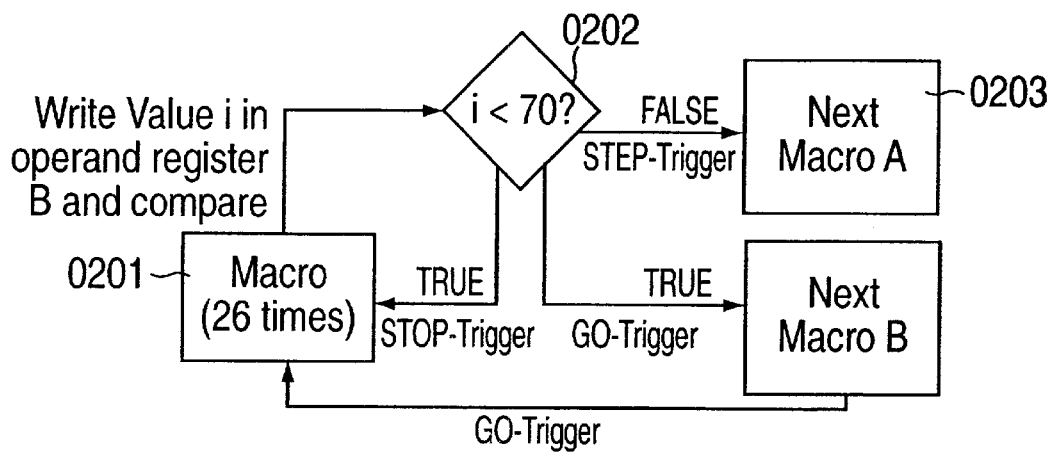
FIG. 2 shows an exemplary comparator construct implemented using multiple triggers in accordance with the present invention.

In PACT02, the configurable registers M/F-PLUREG are managed exclusively over the PLU bus (PACT02, FIG. 2: 0210). To ensure the functional capabilities provided by the present invention, there must also be an additional possibility of access through the normal system bus (PACT02, FIG. 2: 0201). The same thing is true of the new status and configuration registers.

Only the part of the system bus that is interconnected with the PAE over the BM UNIT (PACT02, FIG. 2: 0210) is relevant for the registers. Therefore, the bus is relayed from the BM UNIT to the registers, where upstream multiplexers or upstream gates assume the switching between the PLU bus and the system bus relevant for the PAE.

The multiplexers or gates are wired so that they always switch through the system bus relevant for the PAE except after a reset of the unit (RESET) or when the ReConfig signal (PACT02, FIG. 3: 0306) is active.

Expansion of the System Bus

The system bus (PACT02, FIG. 2: 0201) is expanded to the extent that the information about the target register is transmitted together with the data. This means that an address which selects the desired register at the data receiver is also sent at the same time.

In the example shown in FIG. 1, macro 0103 will be executed 70 times. A single execution of the macro 0103 requires 26 clock cycles. This means that counter 0101 may be decremented by one only once in every 26 clock cycles. One problem with freely programmable units is that it is not always possible to guarantee that the execution of macro 0103 will actually be concluded after 26 clock cycles. A delay can occur, for example, due to the fact that a macro which is supposed to deliver input data for macro 0103 suddenly needs ten clock cycles longer. For this reason, the cell in macro 0103 sends a trigger signal to counter 0101 which determines when the result of the computation is sent to another macro. At the same time, processing of macro 0103 is stopped by the same cell. This cell "knows" exactly when the condition for termination of a computation has been reached.

The trigger signal sent in this case is a STEP trigger which causes counter 0101 to execute its configured function once. The counter decrements its count by one and compares whether it has reached the value zero. If this is not the case, a GO trigger is sent to macro 0103. This GO trigger signal causes macro 0103 to resume its function again.

This process is repeated until counter 0101 has reached a value of zero. Then a trigger signal is sent to macro 0102, where it triggers a function.

A very precise synchronization can be achieved by this interaction of triggers.

FIG. 2 is similar to FIG. 1 except, in this case, the function in element 0202 is not a counter but a comparator. Macro 0201 sends a comparison value to comparator 0202 after each processing run. Depending on the output of the comparison, different triggers are again activated to, for example, cause an action in macros 0203. The construct shown in FIG. 2 corresponds to that of an IF query in a conventional program language.

Figure 3:
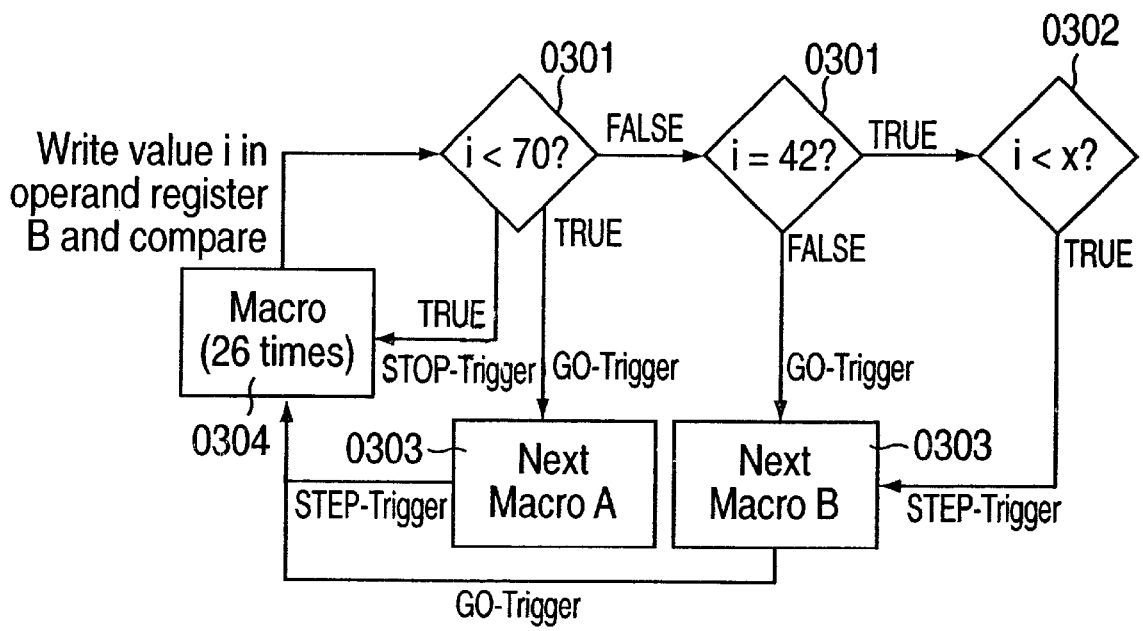
FIG. 3 shows an exemplary comparator construct with multiple outputs implemented by using multiple triggers and interleaving them in accordance with the present invention.

In FIG. 3, several comparators 0301, 0302 are implemented in a construction of an IF-ELSE-ELSE construct (or a multiple choice). By using various types of triggers and connections of these triggers to macros 0303, 0304, a very complex sequences can be easily implemented.

Figure 4:
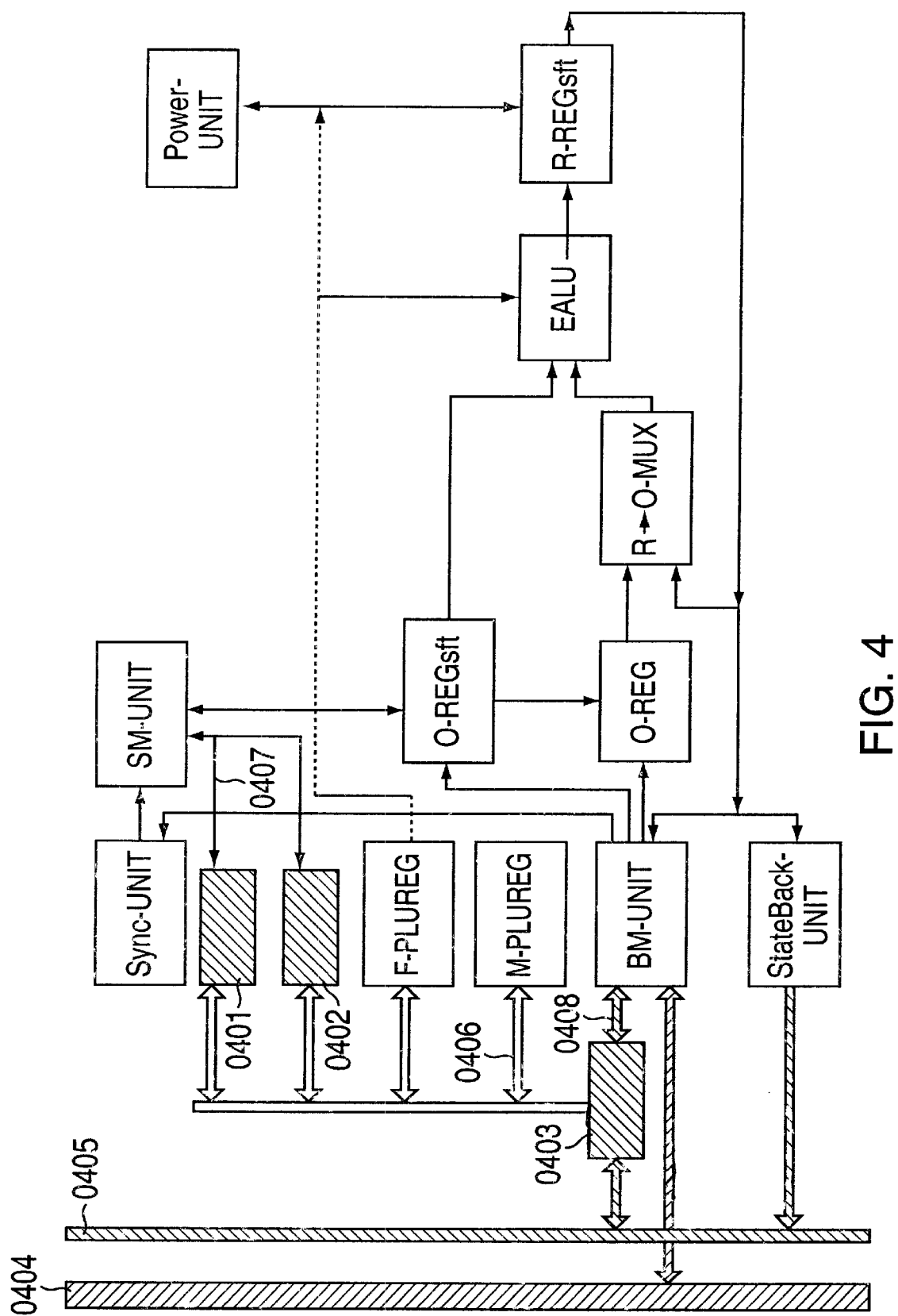
FIG. 4 shows exemplary extensions in comparison with a device from PACT02.

FIG. 4 shows the differences in FIG. 2 in comparison with PACT02 with the differences shown with shading. The configuration register 0401 and the status register 0402 are connected to the SM UNIT over the bus 0407. Registers 0401, 0402, F- and M-PLUREG are connected to a gate 0403 over an internal bus 0206 that connects the internal bus 0406 to the PLU bus 0405 (e.g., to permit configuration by the PLU), or to the BM UNIT over a bus 0408. Depending on the addressing on data bus 0404, the BM unit relays the data to the O-REG or to the addressed register 0401, 0402, F- or M-PLUREG.

GLOSSARY OF TERMS

Definition of Terms

BM UNIT: Unit for sending data on the bus systems outside the PAE. The data is sent over multiplexers for the data inputs and gates for the data outputs. OACK lines are implemented as open-collector drivers. The BM UNIT is controlled by the M-PLUREG.

Data receiver: The unit(s) that further process(es) the results of the PAE.

Data transmitter: The unit(s) that make(s) data available for the PAE as operands.

Data string: A data string consists of a bit sequence of any length. This bit sequence is a processing unit for a system. Commands for processors and similar units as well as strictly data can be coded in a data string.

DFP: Data flow processor according to (unexamined) German Patent Application DE 44 16 881.

DPGA: Dynamically programmable gate array. Known.

EALU: Expanded arithmetic and logic unit. An ALU that has been expanded by adding special functions that are needed or appropriate for operation of a data processing system according to German Patent Application DE 441 16 881 A1. These are counters in particular.

Elements: Collective term for all types of self-contained units which are used as one piece in an electronic unit. Elements are thus:

Configurable cells of all types

Clusters

RAM blocks

Logic units

ALUs

Registers

Multiplexers

I/O pins of a chip

Event: An event can be analyzed by a hardware element in any appropriate manner for the application and it can trigger a conditional action as a response to this analysis. Events are thus, for example:

Clock cycle of a data processing system,

Internal or external interrupt signal,

Trigger signal from other elements within the unit,

Comparison of a data stream and/or a command stream with a value,

Input/output events,

Running, overrunning, resetting, etc. a counter,

Analysis of a comparison.

FPGA: Field-programmable gate array. Known.

F-PLUREG: Register in which the function of the PAEs is set. Likewise, the one-shot and sleep modes are set. The PLU writes into the register.

H level: Logic 1 level, depending on the technology used.

Configurable element: A configurable element is an element of a logic unit which can be set by a configuration string for a specific function. Configurable elements are thus all types of RAM cells, multiplexers, arithmetic and logic units, registers and all types of internal and external interconnection description, etc.

Configurable cell: See logic cells.

Configure: Setting the function and interconnection of a logic unit, a (FPGA) cell or a PAE (see reconfigure).

Configuration data: Any quantity of configuration strings.

Configuration memory: The configuration memory contains one or more configuration strings.

Configuration string: A configuration string consists of a bit sequence of any length. This bit sequence represents a valid setting for the element to be configured, so the result is a functional unit.

Primary logic unit: Unit for configuring and reconfiguring the PAE. Embodied by a microcontroller adapted specifically to its task.

Logic cells: Configurable cells used in DFPs, FPGAs, DPGAs which fulfill simple logical or arithmetic tasks according to their configuration.

L level: Logic 0 level, depending on the technology used.

M-PLUREG: Register in which the interconnection of the PAEs is set. The register is written by the PLU.

O-REG: Operand register for storing the operands of the EALU. Permits chronological and functional independence of the PAEs from the data transmitters. This simplifies the transfer of data because it can take place asynchronously or packet-oriented. At the same time, this creates the possibility of reconfiguring the data transmitters independently of the PAEs or reconfiguring the PAEs independently of the data transmitters.

PLU: Unit for configuring and reconfiguring the PAEs. Embodied by a microcontroller adapted specifically to its function.

SM UNIT: State machine UNIT. State machine that controls an EALU.

Switching table: A switching table is a ring memory which is addressed by a control. The entries in a switching table may contain any configuration strings. The control can execute commands. The switching table responds to trigger signals and reconfigures the configurable elements on the basis of an entry in a ring memory.

Reconfigure: Reconfiguring any quantity of PAEs while any remaining quantity of PAEs continue their own functions (see configure).

Processing cycle: A processing cycle describes the period of time needed by a unit to go from a defined and/or valid state to the next defined and/or valid state.

Cells: Synonym for configurable elements.

Naming conventions

Subassembly:UNIT

Operating mode:MODE

Multiplexer:MUX

Negated signal:not

Register for PLU visible: PLUREG

Register internal:REG
Shift registers: sft

| Function conventions | | |
| --- | --- | --- |
| AND function & | | |
| A | B | Q |
| 0 | 0 | 0 |
| 0 | 1 | 0 |
| 1 | 0 | 0 |
| 1 | 1 | 1 |
| OR function # | | |
| A | B | Q |
| 0 | 0 | 0 |
| 0 | 1 | 1 |
| 1 | 0 | 1 |
| 1 | 1 | 1 |
| NOT function ! | | |
| A | | Q |
| 0 | | 1 |
| 1 | | 0 |
| GATE function G | | |
| EN | D | Q |
| 0 | 0 | — |
| 0 | 1 | — |
| 1 | 0 | 0 |
| 1 | 1 | 1 |

What is claimed is:

1. A method for processing data by a data processor, the data processor including a plurality of cells arranged in a multi-dimensional pattern, comprising the steps of:
   storing result data by a first cell of the plurality of cells into a register of a second cell of the plurality of cells;
   transmitting a first trigger signal by the first cell to the second cell, the first trigger signal having a type;
   receiving the first trigger signal by the second cell; and
   processing the stored result data by the second cell in response to receiving the first trigger signal, the way in which the stored result data is processed by the second cell varying as a function of the type of the first trigger signal.

2. The method according to claim 1, further comprising the steps of:
   storing command data by the first cell into a command register of a third cell of the plurality of cells;
   transmitting a second trigger signal by the first cell to the third cell;
   receiving the second trigger signal by the third cell; and
   executing the stored command by the third cell.

3. The method for processing data by a data processor of claim 2, wherein
   the second trigger signal has a type and the way the stored command is executed by the third cell varies as a function of the type of the second trigger signal.

4. The method for processing data by a data processor of claim 2, further comprising:
   performing a computing operation with the first cell of the plurality of cells; and
   determining the type for the second trigger signal as a function of a result of the computing operation performed with the first cell of the plurality of cells.

5. The method for processing data by a data processor of claim 1, further comprising:
   performing a computing operation with the first cell of the plurality of cells; and
   determining the type for the first trigger signal as a function of a result of the computing operation performed with the first cell of the plurality of cells.

6. The method for processing data by a data processor of claim 5, wherein
   the type of the first trigger signal indicates that the second cell should process the result data in a single step mode, and wherein processing the stored result data by the second cell is carried out in the single step mode.

7. A data processor, comprising:
   a plurality of cells arranged in a multi-dimensional pattern, each of the plurality of cells including at least one respective register, each of the plurality of cells including
      a respective logic unit configured to perform a computer operation producing a result, and
      a respective configuration register, each of the plurality of cells capable of storing the result in the respective configuration register of at least one of the other plurality of cells.

8. The data processor according to claim 7, wherein each of the plurality of cells selectively transmits trigger signals to the at least one of the other plurality of cells.

9. The data processor according to claim 7, wherein the at least one of the other plurality of cells are selectively responsive to the trigger signals.

10. The data processor of claim 7, wherein
    each of the plurality of cells further includes a respective status register, and each of the plurality of cells is capable of storing the result in the respective status register of at least one of the other plurality of cells.

11. The data processor of claim 7, wherein
    each of the plurality of cells further includes a respective command register, and each of the plurality of cells is capable of storing the result in the respective command register of at least one of the other plurality of cells.

12. The data processor of claim 11, wherein
    the computer operation which the respective logic unit is configured to perform is determined by a value stored in the respective command register.

13. The data processor of claim 7, wherein
    each of the plurality of cells further includes a respective operand register, and each of the plurality of cells is capable of storing the result in the respective operand register of at least one of the other plurality of cells.

14. The data processor of claim 13, wherein
    the computer operation which the respective logic unit is configured to perform is performed on a value stored in the respective operand register.

* * * * *